Patented Aug. 16, 1938

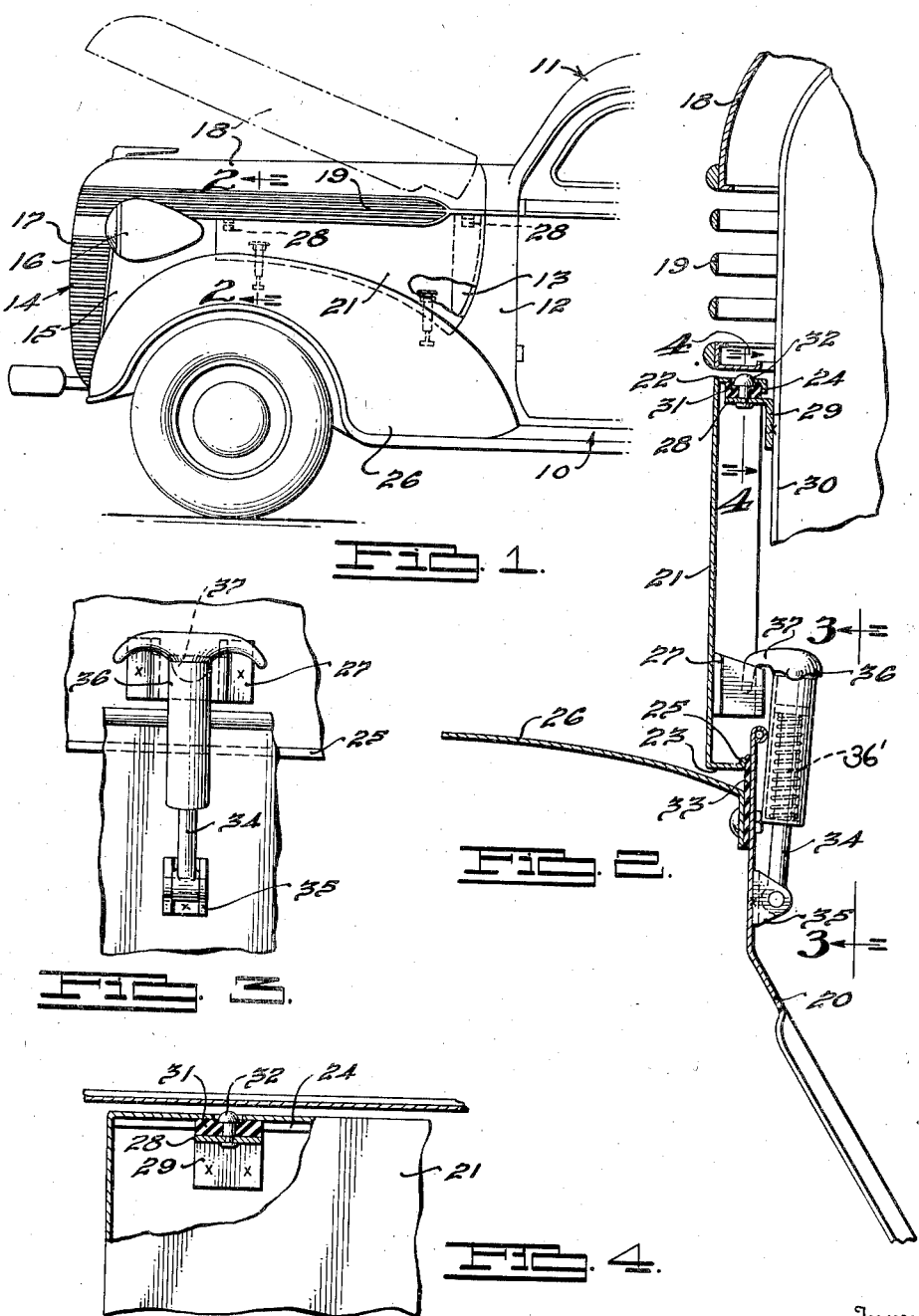

2,127,321

UNITED STATES PATENT OFFICE 2,127,321

MOTOR VEHICLE

Guy D. Barnett, Detroit, Mich., assignor to Chrysler Corporation, Highland Park, Mich., a corporation of Delaware Application February 18, 1937, Serial No. 126,325

2 Claims. (Cl. 180—69)

This invention relates to a motor vehicle and more particularly to a hood for the engine compartment thereof.

An object of the invention is the provision of an improved hood which may be readily moved from its closed position to an open position for affording easy access to the engine compartment; to provide a hood of this type having a portion thereof swingably mounted and which is adapted to be moved to and be retained in open position; to provide side walls for cooperating with the swingably mounted portion when the latter is in its closed position to define the engine compartment; to provide side walls of this type having portions which are readily removable independently of the swingably mounted portion; and to provide improved means for retaining the removable side wall portions in assembled position.

Other objects and advantages of the invention will be more apparent from the following description taken in connection with the accompanying drawing, in which:

Fig. 1 is a fragmentary side elevational view of a vehicle body embodying the invention.

Fig. 2 is a transverse sectional view taken on the line 2—2 of Fig. 1.

Fig. 3 is a fragmentary side elevational view taken on the line 3—3 of Fig. 2.

Fig. 4 is a fragmentary sectional view taken on the line 4—4 of Fig. 2.

The invention is illustrated and described in connection with an automotive vehicle body including an engine compartment and a hood therefor which is movable from its normally closed position to open position for affording access to the compartment. The hood preferably comprises a swingably mounted top closure member and side walls cooperating therewith, portions of the latter being readily removable independently of the top closure member. In a hood construction of this type the top closure member is relieved of the normally downwardly extending integral side walls and the hinged connection therewith and may be easily moved to and retained in its open position. The arrangement illustrated is particularly adaptable in carrying out the general body design and eliminates many lines interrupting the contour of the forward portion of the body which would otherwise be present where there are a plurality of lines formed by the hinge connections between side walls and the cooperating top closure member.

In the embodiment of the invention illustrated herein there is shown a vehicle body, generally designated by the numeral 10, having a forwardly disposed top portion 11 and a cowl having an exposed finished outer surface 12 and an inner portion 13 extending forwardly thereof. At the front of the vehicle is a radiator shell assembly, generally designated by the numeral 14, having side walls, one of which is shown at 15 and to each of which is secured the usual head lamp 16. A suitable grill 17 is included in the assembly 14 and is positioned immediately forward of the radiator core (not shown). Intermediate the cowl and radiator core part (not shown) is a compartment for the power unit. This compartment is provided with a hood comprising a top cover member 18 illustrated in its normally closed position and which is adapted to be swung on a transverse axis by means of suitable hinge supports to an open position for affording access to the engine compartment. In the position illustrated the rear portion of the member 18 overlaps the cowl portions 13 and the forward portion rests upon a top support (not shown) provided by the radiator shell assembly 14 and to which it is adapted to be detachably secured by suitable latching mechanism (not shown).

The member 18 has a grill work 19 at the lower edge thereof extending substantially the entire distance of the longitudinal sides and around the front thereof where it registers with the grill 17 of the radiator shell assembly 14. The engine compartment is also provided with a pair of lower side walls which are normally concealed, one of which being shown at 20, it being understood that a similar side wall is disposed at the opposite side of the compartment.

Intermediate the top cover member 18 and the lower side walls 20 are a pair of removable sheet metal side walls, one of which is shown at 21, it being understood that a similar wall is positioned at the opposite side of the compartment. These side walls 21 overlap the cowl portion 13 in spaced relation and extend forwardly to a side wall 15 of the radiator shell assembly 14. Inasmuch as side walls 21 are similarly constructed and retained in position, it is necessary to illustrate and describe in detail but one thereof.

The side wall 21 has its upper and lower longitudinal edges inwardly bent to form flanges 22 and 23, respectively. The extremities of the same are flanged as at 24 and 25, respectively, into parallel relationship with the main body of the wall. The flange 22 has a substantially flat upper surface registering with the adjacent downwardly extending edge portion of the top closure member, while the lower flange 23 is arcuately shaped to conform to the contour of the adjacent portion of the fender 26. Longitudinally spaced brackets 27 are welded or otherwise secured to the inner face of the side wall 21 and are adapted to be engaged by securing means, hereinafter described, for retaining the side walls 21 in assembled position.

The upper longitudinal flange 22 of a side wall 21 rests upon spaced supports 28 carried by the cowl portion 13 and radiator shell assembly 14, respectively. One of the supports is illustrated in Fig. 2 and comprises a substantially L-shaped bracket 29 which is welded or otherwise secured to an inner member 30 of the radiator shell assembly 14. A yieldable cushioning material 31 is secured to the outwardly extending arm of the bracket 29 by a rivet 32 which projects upwardly through a slot in the flange 22, the slot in each support accommodating longitudinal shifting of the wall 21 so that the brackets 27 will register with the respective securing means therefor. The flange 25 abuts a welt 33 interposed between the adjacent surfaces of the fender 26 and the lower side wall 20.

The side wall 21 is retained in position by suitable securing means engaging the bracket 27, which means are spaced to register with a respective bracket. One of the securing means is illustrated in Figs. 2 and 3 and includes an arm 34 pivotally carried by a bracket 35 welded or otherwise suitably secured to the inner face of the lower side wall 20, and an outer arm 36 having a lateral extension 37 engageable with the bracket 27. The arm 36 is movable axially relative to the arm 34 against the action of a yieldable means such as a spring 36' to a position so that the extension 37 can be engaged with the bracket 27. When the extension 37 engages the bracket 27 a force is exerted downwardly and inwardly on the side wall 21 for securely retaining the latter in position.

In the arrangement illustrated, the side wall 21 is maintained out of contact with the adjacent body structure and is insulated from its support by the yieldable material 31 which, if desired, may comprise rubber adapted to absorb vibrations induced in the side wall 21 by vehicle body road shocks.

Although but one specific embodiment of the invention is herein shown and described, it will be understood that various changes in the size, shape and arrangement of parts may be made without departing from the spirit of this invention.

What I claim is:

1. In a vehicle including fenders arranged at either side thereof, a hood for an engine compartment thereof comprising an upper openable closure member, side walls cooperable with said closure member when the latter is in closed position to define said engine compartment, sections of said side walls being fixed with respect to the vehicle and other sections thereof intermediate said fixed sections and said closure member being readily removable, one of said fixed sections and one of said removable sections being disposed adjacent a respective fender, said last named fixed section projecting vertically beyond the adjacent portion of said fender and forming an abutment for said last named removable section, a support for said removable section, said latter section having flanged opposite edge portions, one of said flanged portions engaging said support and the other of said flanged portions engaging said abutment and spacing said removable section laterally to overlie the adjacent portion of said fender, and means disposed interiorly of said compartment detachably engageable with said removable section for urging the latter downwardly against said support and inwardly against said abutment.

2. In a vehicle including fenders arranged at either side thereof, a hood for an engine compartment thereof comprising an upper openable closure member, side walls cooperable with said closure member when the latter is in closed position to define said engine compartment, sections of said side walls being fixed with respect to the vehicle and other sections thereof intermediate said fixed sections and said closure member being readily removable, one of said fixed sections and one of said removable sections being disposed adjacent a respective fender, said last named fixed section projecting vertically beyond the adjacent portion of said fender and forming an abutment for said last named removable section, a support for said removable section, said latter section having flanged opposite edge portions, one of said flanged portions engaging said support and the other of said flanged portions engaging said abutment and spacing said removable section laterally to overlie the adjacent portion of said fender, said last mentioned flanged portion having a contour conforming substantially to the contour of the adjacent portion of said fender, and securing means carried by one of said sections and detachably engageable with the other of said sections for urging said removable section downwardly against said support and inwardly against said abutment.

GUY D. BARNETT.